(12) United States Patent
Holland et al.

(10) Patent No.: US 9,671,562 B2
(45) Date of Patent: Jun. 6, 2017

(54) MONITORING POWER COMBINERS

(71) Applicant: OFS Fitel, LLC, Norcross, GA (US)

(72) Inventors: William R Holland, Upper Black Eddy, PA (US); Sean Sullivan, Keansburg, NJ (US); William J Strachan, Hillsborough, NJ (US)

(73) Assignee: OFS FITEL, LLC, Norcross, GA (US)

( * ) Notice: Subject to any disclaimer, the term of this patent is extended or adjusted under 35 U.S.C. 154(b) by 503 days.

(21) Appl. No.: 14/373,468

(22) PCT Filed: Jan. 24, 2013

(86) PCT No.: PCT/US2013/022980
§ 371 (c)(1),
(2) Date: Jul. 21, 2014

(87) PCT Pub. No.: WO2013/112730
PCT Pub. Date: Aug. 1, 2013

(65) Prior Publication Data
US 2015/0003498 A1   Jan. 1, 2015

Related U.S. Application Data

(60) Provisional application No. 61/590,316, filed on Jan. 24, 2012.

(51) Int. Cl.
*G02B 6/255* (2006.01)
*G02B 6/28* (2006.01)
*G01K 11/32* (2006.01)
*G06F 11/30* (2006.01)

(52) U.S. Cl.
CPC .............. *G02B 6/255* (2013.01); *G01K 11/32* (2013.01); *G02B 6/2856* (2013.01); *G06F 11/3041* (2013.01); *G06F 11/3058* (2013.01); *G06F 11/3093* (2013.01)

(58) Field of Classification Search
USPC ......................................... 374/161, E11.015
See application file for complete search history.

(56) References Cited

U.S. PATENT DOCUMENTS 5,560,712 A * 10/1996 Kleinerman ....... G01D 5/35377
                                                  250/227.14
2011/0128990 A1* 6/2011 Wu ........................ G01K 11/32
                                                  374/161

* cited by examiner

Primary Examiner — Harshad R Patel
Assistant Examiner — Nasir U Ahmed
(74) Attorney, Agent, or Firm — Sam S. Han, Esq.

(57) ABSTRACT

The disclosed embodiments show a fused fiber combiner with sensors that are strategically located at various locations, thereby permitting performance monitoring of the fused fiber combiner. Additionally, the disclosed embodiments show various processes for determining causes of any performance degradations.

7 Claims, 4 Drawing Sheets

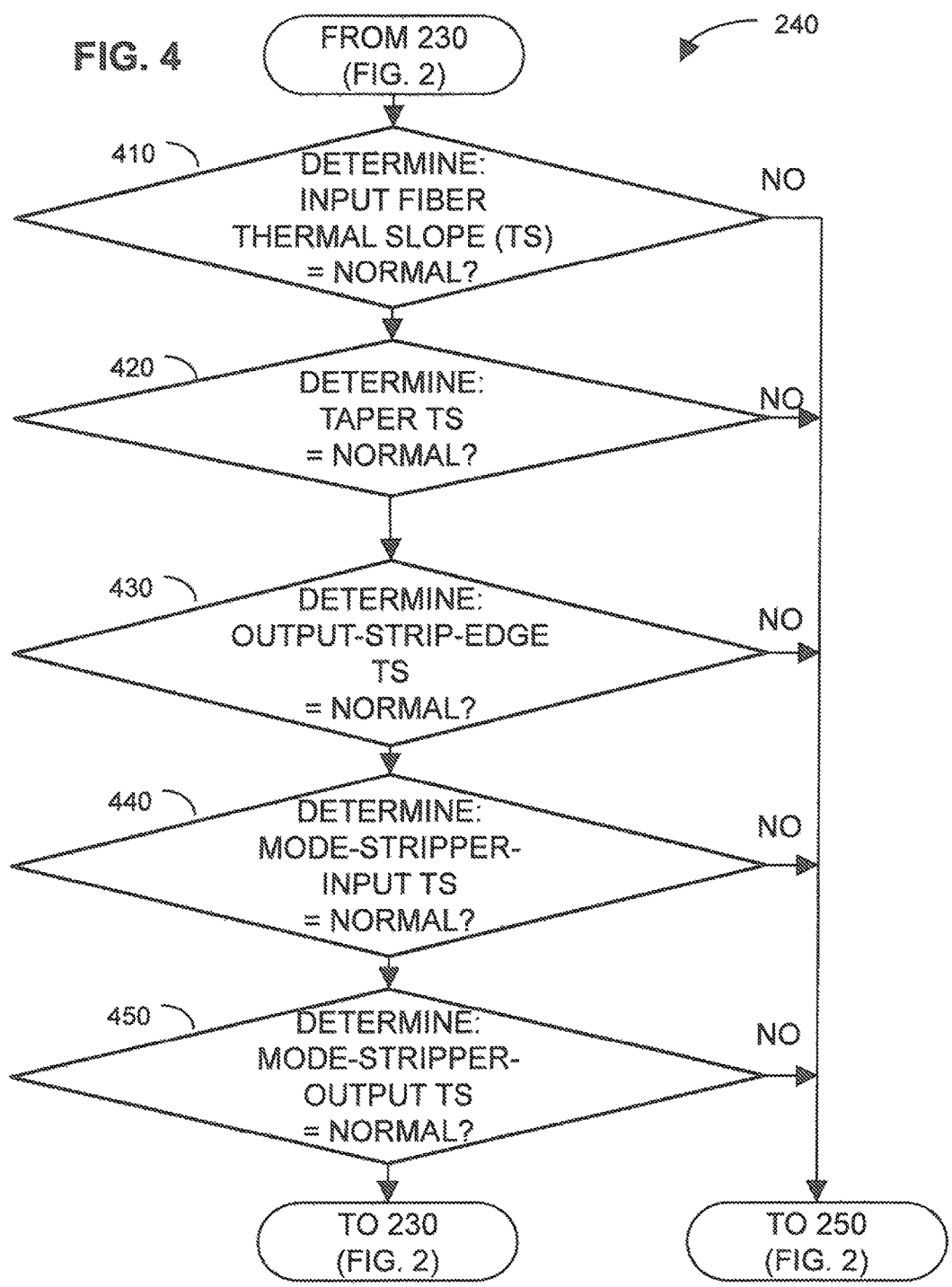

MONITORING POWER COMBINERS

CROSS REFERENCE TO RELATED APPLICATIONS

This application claims the benefit of U.S. provisional patent application Ser. No. 61/590,316, having the title "Performance Monitoring in Power Combiners," filed on 2012 Jan. 24, which is incorporated herein by reference in its entirety.

BACKGROUND

Field of the Disclosure

The present disclosure relates generally to optics and, more particularly, to fiber optics.

Description of Related Art

Fused fiber combiners for high power applications receive multiple inputs from external sources and merge the optical energy into a single common output fiber. To the extent that optical energy can accumulate within these devices, there is a possibility that the fused fiber combiners can experience catastrophic failures. As one can appreciate, there are ongoing efforts to reduce the instances of failure.

SUMMARY

The disclosed systems and methods are directed to fiber combiners. As such, some embodiments are directed to processes that comprise the steps of monitoring thermal conditions associated with a fiber combiner, and analyzing the monitored thermal conditions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is a flowchart showing one embodiment of the determining step of FIG. 2 in greater detail.

DETAILED DESCRIPTION OF THE EMBODIMENTS

Figure 1:
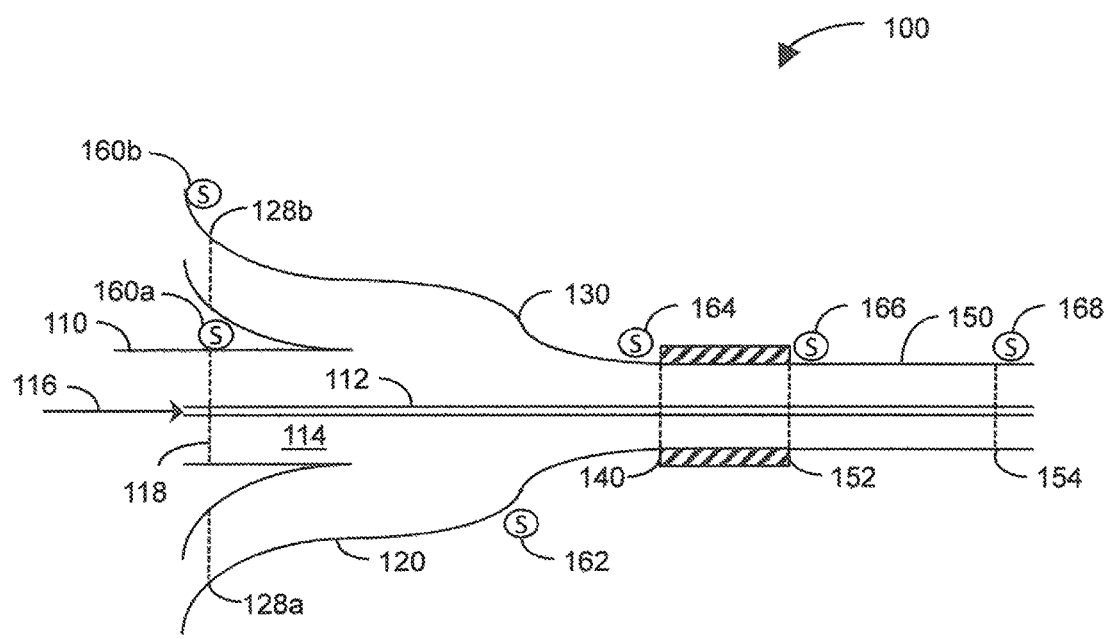
FIG. 1 shows one embodiment of a side view of a fused fiber combiner.

Fused fiber combiners are used in high-power optical applications. The fused fiber combiners, which comprise polymer and glass materials, receive multiple inputs and merge the optical energy from those inputs into a common output fiber. Often, the operating limit of a fused fiber combiner is largely determined by thermal heating, which is generated at various locations within the fused fiber combiner. This heating can produce temperatures that reach or exceed a thermal limit of the polymer or glass material. When this occurs, the fused fiber combiner experiences catastrophic breakdown and failure.

In order to prevent breakdowns (both catastrophic and non-catastrophic), it is beneficial to monitor the thermal conditions at various locations in the fused fiber combiner. From the monitored thermal conditions, one can determine the causes of thermal breakdown and, consequently, improve performance of the fused fiber combiner. The disclosed embodiments show a fused fiber combiner with sensors that are strategically located at various locations, thereby permitting performance monitoring of the fused fiber combiner. Additionally, the disclosed embodiments show various processes for determining the causes of any performance degradations.

With this in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 shows one embodiment of a side view of a fused fiber combiner 100 with sensors 160, 162, 164, 166, 168, which monitor the thermal conditions at various locations of the fused fiber combiner 100. As shown in the embodiment of FIG. 1, the fused fiber combiner 100 comprises a signal fiber 110 that is fused with multiple pigtail fibers 120a . . . 120b (collectively, 120). The signal fiber 110 comprises a core 112 and a cladding 114, where an input signal 116 is injected into the signal fiber 110 and is contained within the core 112. The signal fiber 110 and the pigtail fibers 120 are typically spliced to input sources (not shown) at their respective input splices 118, 128a . . . 128b (collectively, 128). Thus, these input splices 118, 128 are where the customer fiber-laser sources are interfaced to the fused fiber combiner 100, typically through fusion splices.

As shown in in FIG. 1, there are thermal sensors 160a . . . 160b (collectively, 160) at the input splices 118, 128 to monitor the thermal conditions at those splices 118, 128. Specifically, the input-splice sensors 160 provide an indication of what is occurring at the input splices 118, 128. For example, a measurement of the thermal slope (change in temperature with respect to input power, or $\Delta$Temp/$\Delta$Power (Watts)) at the input-splice sensors 160 provides a linear calibration of the input or launched power as core light passes through the splice. Since the splices 118, 128 join single-moded fibers in the embodiment of FIG. 1, one can expect to see very low light loss at these splices 118, 128. Additionally, if there should be any lost light at the splices 118, 128, then that lost light is expected to have a very low numerical aperture (NA), for example, 0.08, which would produce a small thermal slope when compared to launched power. Thus, an unusually large thermal slope at the input splices 118, 128 may be evidence of higher-than-normal NA light that is propagating past the input splices 118, 128 as cladding light. It should be appreciated that while FIG. 1 shows a single-mode embodiment, similar principles apply to multi-mode embodiments. For such multi-mode embodiments, the thermal slope may be higher than for single-mode embodiments. However, similar to the single-mode embodiments, the multi-mode embodiments can likewise be calibrated based on expected thermal performance.

Continuing with FIG. 1, if each of the input splices 118, 128 has its own sensor 160, then it is also possible to measure thermal conditions in the pigtail fibers 120 that are not being used. Consequently, heating at the input of any unused pigtail fiber 120 may be evidence of backward-propagating core light, since heat is not expected in pigtail fibers 120 that do not propagate light.

Moving forward in the light-propagation direction, since multiple fibers 110, 120 converge within the fused fiber combiner 100, the fused fiber combiner 100 typically exhibits a taper 130. As shown in FIG. 1, signal fiber 110 and pigtail fibers 120 converge and are tapered to form glass taper 130.

Also shown in FIG. 1, a thermal sensor 162 is located at the glass taper 130 to monitor thermal conditions at the glass taper 130. Typically, the glass taper 130 is not expected to heat because it is a glass structure. However, high temperatures can be generated at the glass taper 130 if a sufficiently-high NA light (e.g., greater than 0.1) enters the taper 130 and becomes higher-NA light as it propagates down the taper 130. When this occurs, it is possible for the higher-NA light to become trapped in a transverse standing-wave condition, thereby generating heat. In other words, a high temperature at the glass taper 130 is indicative of cladding light from the input laser causing the taper to heat. Thus, sensor 162 located at the glass taper 130 allows for measurement of the thermal conditions occurring at this location.

Beyond the glass taper 130, the fused fiber combiner 100 optionally can be spliced to an output glass fiber. The output fiber can comprise a region where the coating has been removed (or stripped), with the transition between the coated region and the stripped region being designated as an output strip edge 140. For the embodiment of FIG. 1, the system comprises the output strip edge 140, where the polymer coating begins on the output glass fiber that is attached to the glass taper 130. As shown in FIG. 1, another thermal sensor 164 is located at the output strip edge 140 to monitor the thermal conditions at the output strip edge 140.

The output strip edge 140 is prone to heating when there is incident light with a sufficiently-high NA that cannot be contained within the polymer coating. Generally, a large thermal slope at the output-strip edge 140 is evidence of very high-NA light (e.g., greater than approximately 0.3 or 0.45 for silicone or low-index polymer coating materials) striking the output strip edge 140. As such, a high thermal slope at the output-strip edge 140 can be indicative of a bad splice.

A mode stripper 150 can reside after the output-strip edge 140 to remove any residual cladding light prior to output. To the extent that the mode stripper 150 has a mode-stripper input 152 and a mode-stripper output 154, there is a mode-stripper-input sensor 166 and a mode-stripper-output sensor 168 to monitor the thermal conditions at the mode-stripper input 152 and the mode-stripper output 154, respectively.

The mode-stripper-input sensor 166 detects light that is present in the cladding 114. Normally, this represents light having a NA that is sufficiently low such that it passes through the output-strip edge 140 and is subsequently guided by the coating material. As such, the thermal slope measured by sensor 166 at the mode-stripper input 152 provides a linear calibration of the transmitted power that remains in the core, since a small (and proportional) fraction of the light will be lost in the cladding.

The mode-stripper output 154 should see no cladding light, since the mode stripper 150 functions to strip out the cladding light before the light arrives at the mode-stripper output 154. Thus, if the mode-stripper-output sensor 168 detects an abnormal thermal slope, then this abnormal thermal slope is evidence of backward-propagating cladding light.

Given that each of the sensors 160, 162, 164, 166, 168 supplies evidence of different thermal conditions within the fused fiber combiner 100, it is possible to trouble-shoot various conditions based on the thermal readings at these various locations. For example, based on different permutations of sensor readings, one can determine whether thermal abnormalities within the fused fiber combiner 100 are due to manufacturing defects or improper installation. Furthermore, the sensor readings can be used to monitor performance during normal operation, with an alarm being triggered when an abnormal condition arises. Additionally, thermal monitoring can be used to measure actual stresses within the fused fiber combiner 100. Thus, for failure analysis, the actual stresses may be used to quantify any operation that pushes the fused fiber combiner 100 beyond its stated warranty, and the magnitude of any over-the-limit operation can be factored into future design optimizations.

These, and other, types of analyses can be performed by operatively coupling the sensors to a computer or other dedicated hardware device that comprises suitable logic to determine proper manufacturing, proper installation, or proper operation of the fused fiber combiner 100, or logic to conduct failure analysis of the fused fiber combiner 100. Various examples of processes that can be implemented with thermal monitoring are shown in FIGS. 2 through 4.

Figure 2:
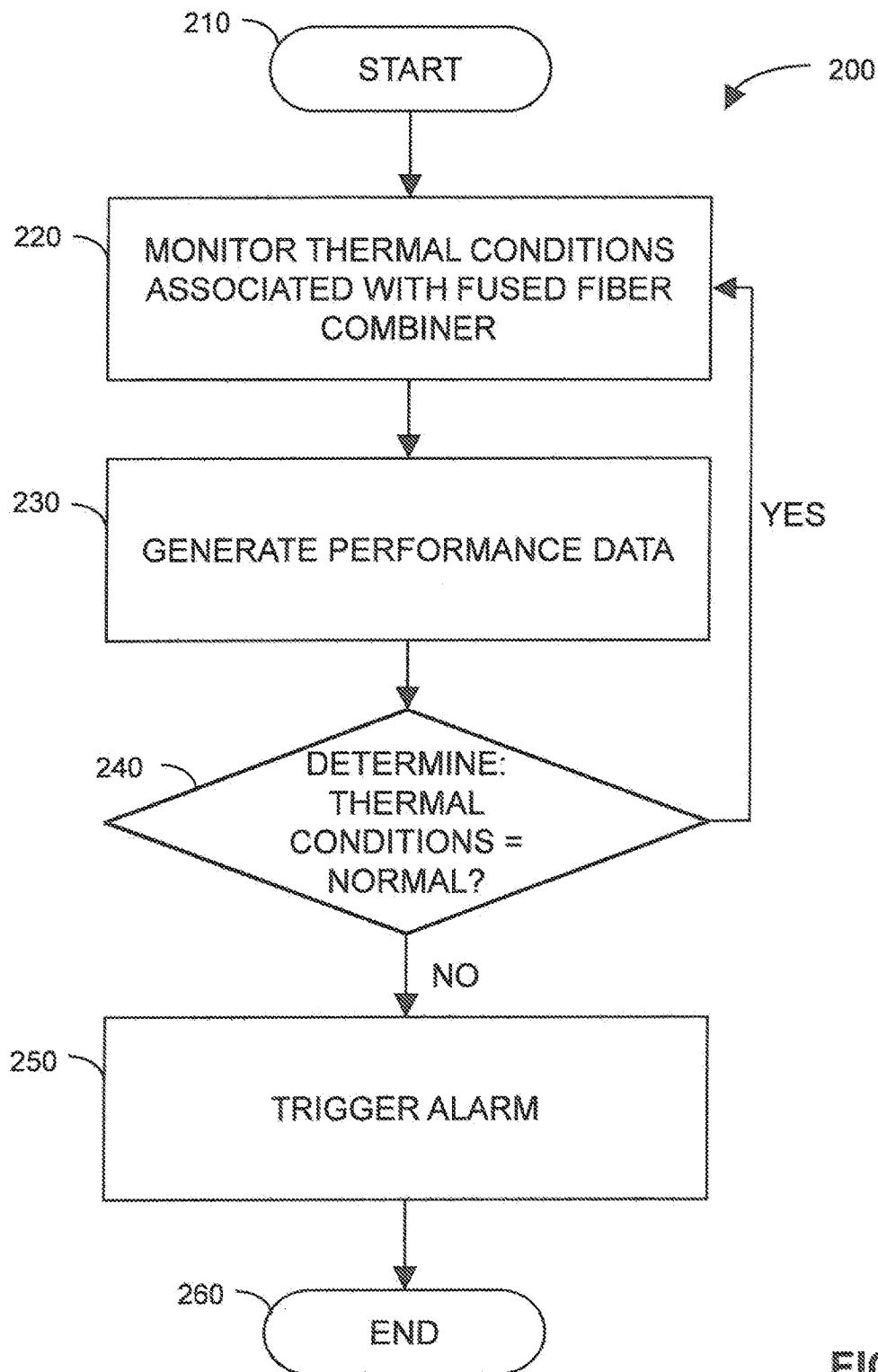
FIG. 2 is a flowchart showing one embodiment of a process for monitoring performance of a fused fiber combiner.

FIG. 2 is a flowchart showing one embodiment of a process 200 for monitoring performance of a fused fiber combiner 100. In the embodiment of FIG. 2, the process 200 starts at step 210 with step 220 monitoring thermal conditions associated with the fused fiber combiner 100 using sensors such as sensors 160, 162, 164, 166, and 168 discussed in FIG. 1. Thereafter, the process 200 generates performance data at step 230. With the generated 230 data, the process 200 then determines whether the monitored thermal conditions are normal at step 240. If the monitored thermal conditions are normal, then the process 200 continues to monitor 230 the thermal conditions. If, however, the monitored thermal conditions are not normal (e.g., the measurements exhibit a high thermal slope, etc.), then the process 200 triggers an alarm at step 250 and ends at step 260, hopefully prior to any damage occurs to the fused-fiber combiner 100. As one can appreciate, the ability to examine the thermal data at various points within the fused fiber combiner 100 provides a useful tool to diagnose any potential problems, or to simply monitor the performance of the fused fiber combiner 100.

Figure 3:
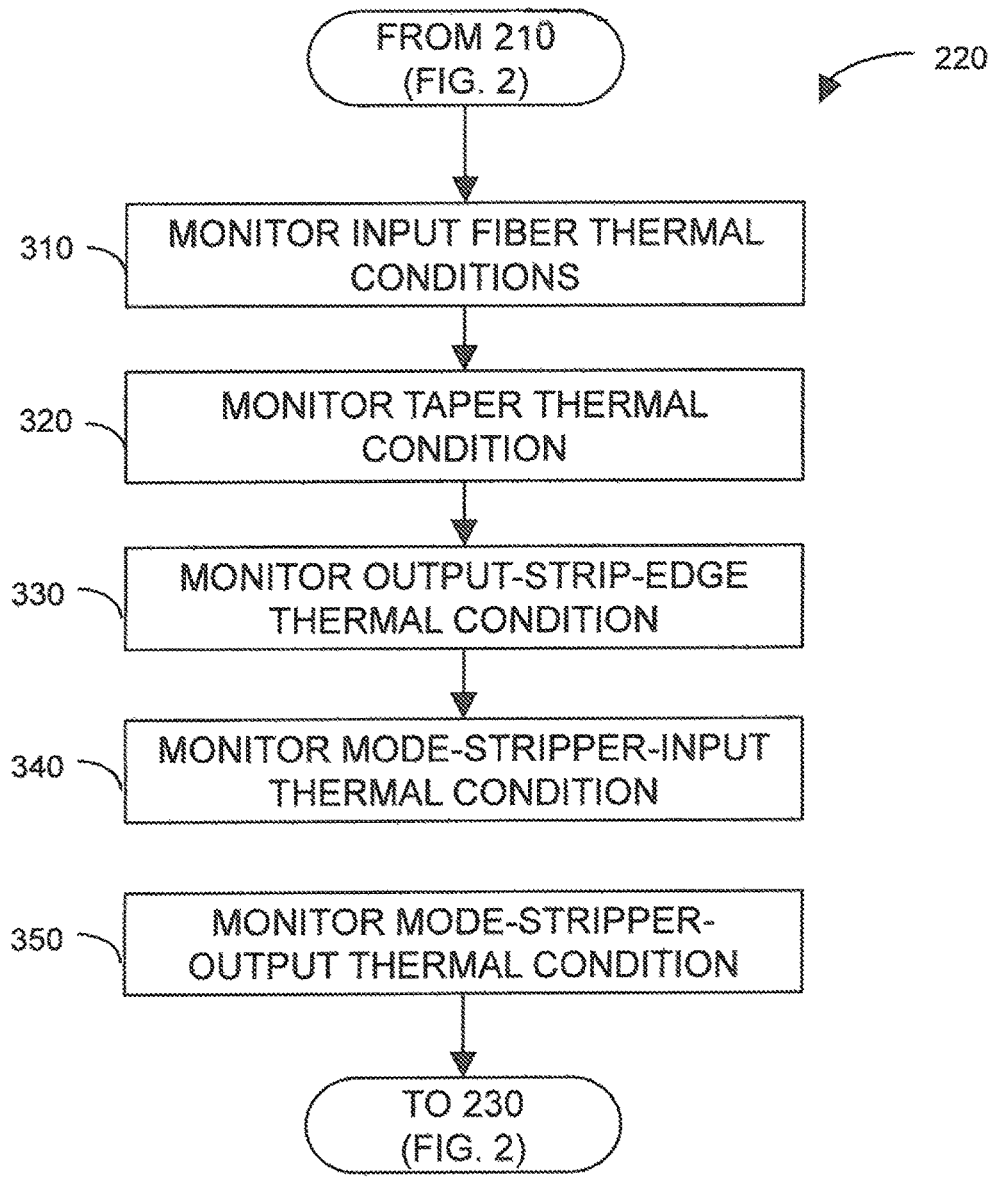
FIG. 3 is a flowchart showing one embodiment of the monitoring step of FIG. 2 in greater detail.

FIG. 3 is a flowchart showing one embodiment of the monitoring step 220 of FIG. 2 in greater detail. In the embodiment of FIG. 3, the process 200 monitors thermal conditions at the input fibers in step 310 by monitoring the input splices 118, 128. Next, the process 200 sequentially: (a) monitors the thermal conditions at the taper 130 in step 320; (b) monitors the thermal conditions at the output-strip edge 140 in step 330; and (c) monitors the thermal conditions at the input 152 and the output 154 of the mode stripper 150 in steps 340 and 350, respectively. Corresponding to these locations, the performance data from FIG. 2 includes data associated with thermal conditions at: (a) the input fibers or the input spices 118, 128; (b) the taper 130; (c) the output-strip edge 140; (d) the mode-stripper input 152; (e) the mode-stripper output 154; or (f) any combination of these components. Performance data is then generated in step 230 from the locations monitored in step 220.

FIG. 4 is a flowchart showing one embodiment of the determining step 240 of FIG. 2 in greater detail. As shown in FIG. 4, the process 200 determines, within step 240, whether the thermal slope at the input fiber is normal at step 410. If the thermal slope at the input fiber is not normal (e.g., a high thermal slope), then an alarm is triggered in step 250. By way of example, the alarm may include an indication that cladding light with a higher-than-normal numerical aperture (NA) is propagating through the input splices 118, 128.

The process 200 next determines, in step 420, whether the thermal slope at the taper 130 is normal. If the thermal slope at the taper 130 is not normal (e.g., high thermal slope), then the alarm is triggered in step 250. In the event of a high thermal slope at the taper 130, the alarm can include an indication that a high NA light is trapped in a transverse standing wave within the taper 130.

The process next determines, at step 430, whether the thermal slope at the output-strip edge 140 is normal. If the thermal slope at the output-strip edge 140 has a high thermal slope, then the alarm is triggered at step 250 with, for example, an indication that a very high NA light is striking the output-strip edge. The existence of very high NA light at the output-strip edge may be evidence of a bad splice between the input laser and the fused fiber combiner 100.

Next, the process determines in steps 440 and 450 whether the thermal slopes at the input 152 and the output 154 of the mode stripper 150 are normal. An abnormally-high thermal slope at the output 154 of the mode stripper 150 would trigger an alarm in step 250 that, for example, indicates the presence of backward-propagating cladding light.

As one can appreciate, these various indications can be used, either alone or in combination with other indications, to provide a useful diagnostic tool for the fused fiber combiner 100. Several diagnostic examples are provided below.

By way of example, if the input splices 118, 128 and the taper 130 both exhibit high thermal slopes, then the system may diagnose the problem as being caused by cladding light from a customer's input lasers. In another example, if the input splices 118, 128 and the output-strip edge 140 both exhibit high thermal slopes, then the system may diagnose the problem as being caused by a bad splice. In a third example, if the mode-stripper output 154 exhibits a high thermal slope, then the system may diagnose the problem as being caused by backward-propagating cladding light.

The thermal monitoring may also provide information, even when there are no inputs at some of the splices 128. For those conditions, if the input fiber (with no input) has a high thermal signature (which it should not), then this would be an indication that there is heat that is generated from backward-propagating core light.

As one can appreciate, this type of monitoring can be useful for trouble-shooting any issues with the fused fiber combiner 100. For example, if both the input splices 118, 128 and the taper 130 exhibit normal thermal conditions, then this would be an indication that there are no manufacturing defects and, consequently, any failure or performance issues can be attributed to improper installation or other non-manufacturing process.

From the disclosed embodiments, one can readily appreciate that other permutations and combinations can be used to diagnose potential problems with the fused fiber combiner 100. Thus, the disclosed embodiments provide a useful diagnostic tool, as well as a useful development tool.

The performance monitoring process, as shown above, may be implemented in hardware, software, firmware, or a combination thereof. In the preferred embodiment(s), the performance monitoring process is implemented in software or firmware that is stored in a memory and that is executed by a suitable instruction execution system. If implemented in hardware, as in an alternative embodiment, the performance monitoring process can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The process can be implemented by the use of a computer program, which comprises an ordered listing of executable instructions for implementing logical functions, which can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

As one can appreciate, the thermal sensors 160, 162, 164, 166, 168 can be implemented with thermistors, thermal absorbing materials, fiber Bragg gratings (FBG), thermocouples, photodetectors, or other suitable material for monitoring thermal conditions. For some embodiments, the thermal sensors can also be implemented using thermal imaging techniques. In those embodiments, rather than having discrete sensors, the thermal monitoring at the various locations would be accomplished by the image intensity or other color-coding that is available in the imaging system.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A thermal monitoring system, comprising;
input fibers for receiving optical signals;
a glass taper where the input fibers converge and are fused together;
an output fiber optically coupled to the glass taper, the output fiber comprising an output strip edge, the output fiber further comprising a mode stripper, the mode stripper comprising a mode-stripper input and a mode-stripper output;
input-splice sensors, each input-splice sensor being operatively coupled to a corresponding input fiber, each input-splice sensor to monitor thermal conditions associated with its corresponding input fiber;
a taper thermal sensor operatively coupled to the glass taper, the taper thermal sensor to monitor thermal conditions associated with the glass taper;
an output-strip-edge thermal sensor operatively coupled to the output strip edge, the output-strip-edge thermal sensor to monitor thermal conditions associated with the output strip edge;
a mode-stripper-input sensor operatively coupled to the mode-stripper input, the mode-stripper-input sensor to monitor thermal conditions associated with the mode-stripper input; and
a mode-stripper-output sensor operatively coupled to the mode-stripper output, the mode-stripper-output sensor to monitor thermal conditions associated with the mode-stripper output.

2. A system, comprising:
a fused fiber combiner, comprising:
input fibers to receive optical signals; and
a glass taper where the input fibers converge and are fused together; and
sensors to monitor thermal conditions associated with the fused fiber combiner, the sensors comprising:
input-splice sensors, each input-splice sensor being operatively coupled to a corresponding input fiber, each input-splice sensor to monitor thermal conditions associated with its corresponding input fiber; and
a taper thermal sensor operatively coupled to the glass taper, the taper thermal sensor to monitor thermal conditions associated with the glass taper.

3. The system of claim 2, further comprising an output fiber optically coupled to the glass taper, the output fiber comprising an output-strip edge, the output fiber further comprising a mode stripper, the mode stripper comprising a mode-stripper input and a mode-stripper output.

4. The system of claim 3, the sensors comprising:
an output-strip-edge thermal sensor operatively coupled to the output strip edge, the output-strip-edge thermal sensor to monitor thermal conditions associated with the output strip edge.

5. The system of claim 2, the sensors comprising:
a mode-stripper-input sensor operatively coupled to an input of the mode stripper, the mode-stripper-input sensor to monitor thermal conditions associated with the input of the mode stripper; and
a mode-stripper-output sensor operatively coupled to an output of the mode stripper, the mode-stripper-output sensor to monitor thermal conditions associated with the output of the mode stripper.

6. The system of claim 2, the sensors comprising:
means for monitoring thermal conditions associated with an output of the mode stripper.

7. The system of claim 2, further comprising:
a non-transient computer-readable medium operatively coupled to the sensors, the non-transient computer-readable medium comprising:
logic to determine proper manufacturing of the fused fiber combiner based on the monitored thermal conditions;
logic to determine proper installation of the fused fiber combiner based on the monitored thermal conditions;
logic to determine proper operation of the fused fiber combiner based on the monitored thermal conditions; and
logic to conduct failure analysis of the fused fiber combiner based on the monitored thermal conditions.

* * * * *